(12) United States Patent  (10) Patent No.: US 8,095,089 B1
Viehweg et al.  (45) Date of Patent: *Jan. 10, 2012

(54) PREDICTIVE TRANSMITTER CALIBRATION

(75) Inventors: Frank Viehweg, Bruschal (DE); Devin Gharibian-Saki, Ettlingen (DE)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,908

(22) Filed: Jan. 31, 2011

Related U.S. Application Data

(63) Continuation of application No. 11/975,980, filed on Oct. 23, 2007, now Pat. No. 7,881,680.

(60) Provisional application No. 60/862,520, filed on Oct. 23, 2006.

(51) Int. Cl.
    H04B 1/04    (2006.01)
    H04K 1/02    (2006.01)

(52) U.S. Cl. ............... 455/114.3; 455/115.1; 455/127.2; 455/67.13; 375/296

(58) Field of Classification Search ............... 455/114.1, 455/114.2, 114.3, 115.1, 126, 127.2, 67.13; 375/296, 297
    See application file for complete search history.

(56) References Cited

U.S. PATENT DOCUMENTS

| | | | | |
|---|---|---|---|---|
| 5,049,832 A * | 9/1991 | Cavers | ........................... | 330/149 |
| 5,778,029 A * | 7/1998 | Kaufmann | ..................... | 375/296 |
| 5,862,460 A * | 1/1999 | Rich | .............................. | 455/116 |
| 5,867,065 A * | 2/1999 | Leyendecker | ................. | 330/149 |
| 5,959,500 A * | 9/1999 | Garrido | .......................... | 330/151 |
| 6,011,434 A * | 1/2000 | Sakai | .............................. | 330/151 |
| 6,141,390 A * | 10/2000 | Cova | .............................. | 375/297 |
| 6,255,908 B1 * | 7/2001 | Ghannouchi et al. | .......... | 330/149 |
| 6,373,902 B1 * | 4/2002 | Park et al. | ....................... | 375/296 |
| 6,731,168 B2 * | 5/2004 | Hedberg et al. | ................ | 330/149 |
| 6,782,335 B1 * | 8/2004 | Lynaugh et al. | ................ | 702/107 |
| 6,798,843 B1 * | 9/2004 | Wright et al. | ................... | 375/296 |
| 6,937,669 B2 * | 8/2005 | Tomerlin et al. | ............... | 375/297 |
| 6,996,378 B2 * | 2/2006 | Helms | .............................. | 455/91 |
| 6,999,523 B2 * | 2/2006 | Posti | .............................. | 375/296 |
| 7,023,273 B2 * | 4/2006 | Johnson et al. | ................ | 330/149 |
| 7,109,792 B2 * | 9/2006 | Leffel | ............................. | 330/149 |
| 7,183,847 B2 * | 2/2007 | Suzuki et al. | .................. | 330/149 |
| 7,535,298 B2 * | 5/2009 | Sihlbom et al. | ................ | 330/149 |
| 7,881,680 B1 * | 2/2011 | Viehweg et al. | ............... | 455/114.3 |
| 2003/0053552 A1 * | 3/2003 | Hongo et al. | .................. | 375/295 |
| 2005/0162225 A1 * | 7/2005 | Suzuki et al. | .................. | 330/149 |
| 2007/0190952 A1 * | 8/2007 | Waheed et al. | ............. | 455/114.3 |
| 2008/0139141 A1 * | 6/2008 | Varghese et al. | ............ | 455/114.3 |
| 2009/0280758 A1 * | 11/2009 | Pratt et al. | ................... | 455/127.2 |

* cited by examiner

*Primary Examiner* — Duc M Nguyen

(57) ABSTRACT

A method and apparatus for calibrating a device. The method includes: selecting a first power level at which a device is to transmit a radio frequency signal; receiving a radio frequency signal having been transmitted from the device based on a predetermined calibration value associated with the first power level; measuring a power level of the radio frequency signal transmitted from the device; based on the measured power level of the radio frequency signal, adjusting the predetermined calibration value associated with the first power level so that (i) a measured power level associated with a radio frequency signal transmitted from the device based on the adjusted predetermined calibration value falls within a predetermined range of the first power level; and based on the adjusted predetermined calibration value, calibrating each predetermined calibration value for a plurality of power levels other than the first power level.

16 Claims, 3 Drawing Sheets

PREDICTIVE TRANSMITTER CALIBRATION

This application is a continuation of U.S. application Ser. No. 11/975,980, filed Oct. 23, 2007, which claims priority under 35 U.S.C. §119(e) to U.S. Provisional Application No. 60/862,520, filed on Oct. 23, 2006. The disclosures of the applications referenced above are incorporated herein by reference.

BACKGROUND

The present invention relates generally to signal transmission. More particularly, the present invention relates to predictive transmitter calibration.

In general, transmitters must be calibrated after manufacture to ensure that the transmitted power falls within ranges set by design, industry standards, and the like. For example, a wireless local-area network (WLAN) chip generally includes a register to store a calibration value for each of the multiple power levels at which the chip can transmit, and in each of the multiple frequency bands the chip employs. During calibration, in each channel, and for each power level, a receiver measures the power transmitted by the chip, and adjusts the respective calibration value to bring that power level within a predetermined range. Currently, this process must be repeated several times for each power level, for each frequency band, for each chip. The current calibration scheme is therefore expensive and time-consuming.

SUMMARY

In general, in one aspect, this specification discloses a method and apparatus for calibrating a device. The method includes: selecting a first power level at which a device is to transmit a radio frequency signal; receiving a radio frequency signal having been transmitted from the device based on a predetermined calibration value associated with the first power level; measuring a power level of the radio frequency signal transmitted from the device; based on the measured power level of the radio frequency signal, adjusting the predetermined calibration value associated with the first power level so that (i) a measured power level associated with a radio frequency signal transmitted from the device based on the adjusted predetermined calibration value falls within a predetermined range of the first power level; and based on the adjusted predetermined calibration value, calibrating each predetermined calibration value for a plurality of power levels other than the first power level.

The details of one or more implementations are set forth in the accompanying drawings and the description below. Other features will be apparent from the description and drawings, and from the claims.

Figure 1:
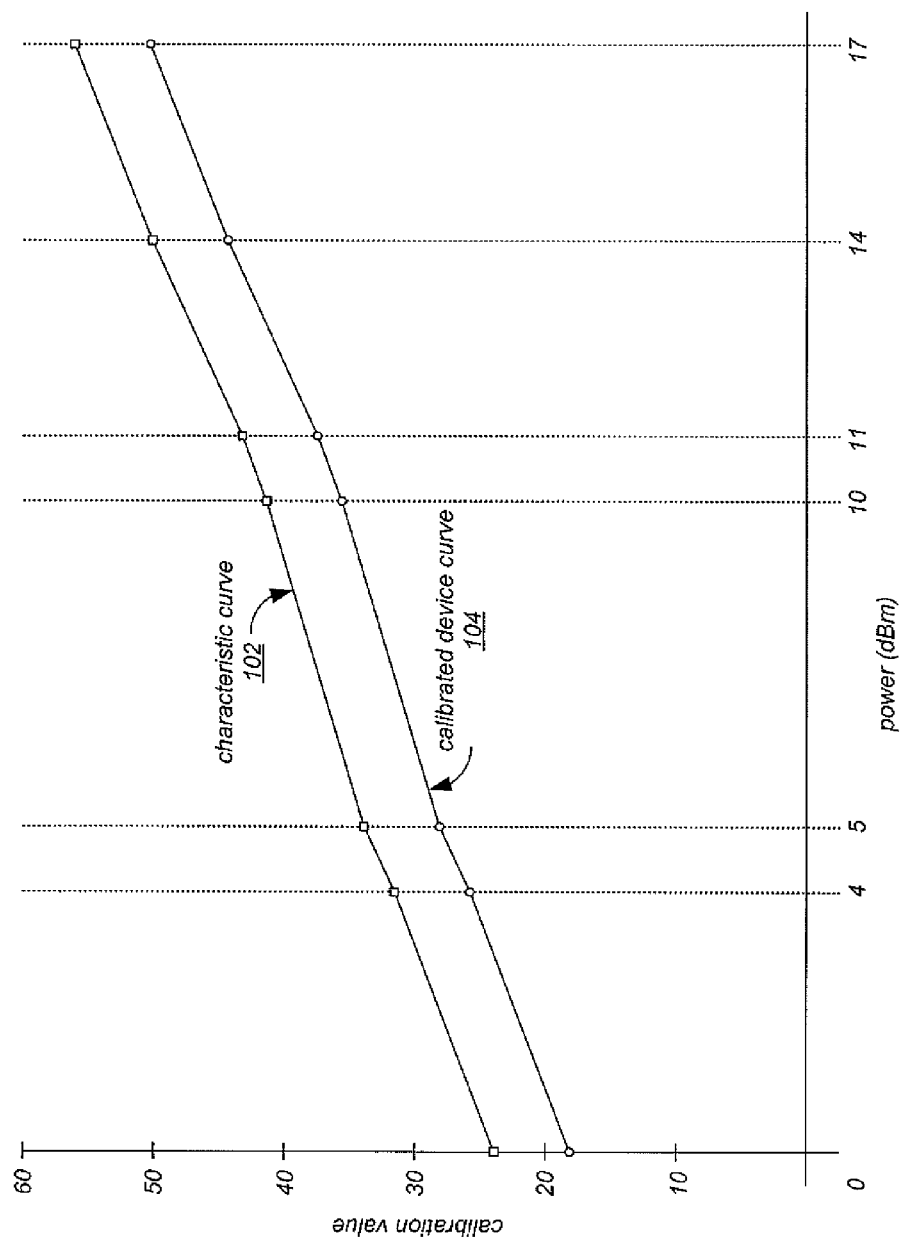
FIG. 1 shows plots of calibration values vs. power levels for a characteristic curve and a calibrated curve.

The leading digit(s) of each reference numeral used in this specification indicates the number of the drawing in which the reference numeral first appears.

DETAILED DESCRIPTION

Embodiments of the present invention provide predictive transmitter calibration techniques that are especially useful with integrated circuit transmitters such as WLAN chips. The inventors have discovered that, for a group of related chips, the relationship between calibration values and transmitted power exhibits a characteristic calibration curve that differs between the chips only in the value of the intercept of the curve with the calibration value axis. Based on this discovery, the inventors have developed a new calibration technique in which, once the characteristic curve has been established for a group of chips, only one power point on the curve need be determined for each chip during calibration. Then the remaining points on the curve can be calculated rather than measured. For example, the calibration value offsets between the power points on the characteristic curve can be determined and used to determine the calibration values for each chip during calibration. Thus multiple power levels for a chip can be calibrated by measuring only one of the power levels. For example, Table 1 shows a table of power levels, calibration values, and offsets characteristic of an example group of chips.

TABLE 1

| Power (dBm) | Calibration value | Offset |
|---|---|---|
| 0 | 0x18 | — |
| 4 | 0x20 | 0x20 − 0x18 = 8 |
| 5 | 0x22 | 0x22 − 0x20 = 2 |
| 10 | 0x2A | 0x2A − 0x22 = 8 |
| 11 | 0x2D | 0x2D − 0x2A = 3 |
| 14 | 0x32 | 0x32 − 0x2D = 5 |
| 17 | 0x39 | 0x39 − 0x32 = 7 |

In the example of Table 1, each offset is calculated as the difference in the calibration values between the current power point and the previous power point. Of course, the offsets can be calculated in other ways. For example, all of the offsets could be referenced to the same power point, and the like. The characteristic data of Table 1 can be obtained by calibrating a statistically significant number of the chips in a group by conventional measurement methods, and compiling the calibration values to obtain the calibration value offsets shown in Table 1.

Table 2 shows a table of power levels and calibration values calculated for a single chip from the group of chips characterized by Table 1.

TABLE 2

| Power (dBm) | Calibration value |
|---|---|
| 0 | 0x12 (measured) |
| 4 | 0x12 + 8 = 0x1A |
| 5 | 0x1A + 2 = 0x1C |
| 10 | 0x1C + 8 = 0x24 |
| 11 | 0x24 + 3 = 0x27 |
| 14 | 0x27 + 5 = 0x3C |
| 17 | 0x3C + 7 = 0x43 |

Referring to Table 2, only a single power point (0 dBm) has been calibrated by conventional measurement techniques, resulting in a calibration value of 0x12 for that power point. The remaining calibration values in Table 2 have been calculated using the calibration value and the offsets from Table 1. For example, the calibration value for the second power point (4 dBm) is calculated by adding the offset for that power point from Table 1 (8) to the measured calibration value (0x12) of the previous power point (0 dBm) to yield 0x12+8=0x1A. FIG. 1 shows plots of calibration values vs. power levels for both the characteristic curve 102 of Table 1 and the calibrated curve 104 for the chip of Table 2. Note that the only significant difference in the curves is the value of the intercept with the calibration value axis.

Figure 2:
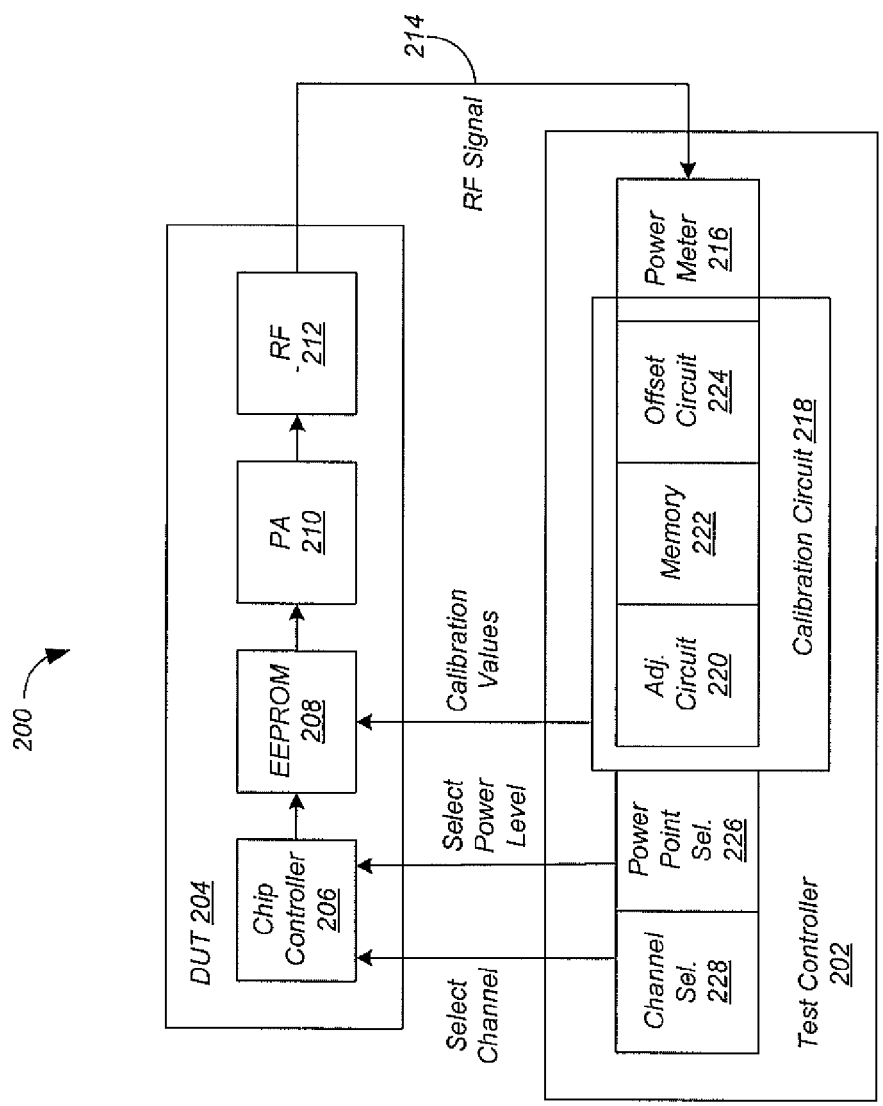
FIG. 2 shows a WLAN chip calibration system comprising a test controller in communication with a device-under-test according to some embodiments of the present invention.

FIG. 2 shows a WLAN chip calibration system 200 comprising a test controller 202 in communication with a device-under-test (DUT) 204 according to some embodiments of the present invention. DUT 204 can be compliant with all or part of IEEE standard 802.11, including draft and approved amendments such as 802.11a, 802.11b, 802.11e, 802.11g, 802.11i, 802.11k, 802.11n, 802.11v, and 802.11w. But while embodiments of the present invention are described with respect to calibrating WLAN chips, they are also applicable to calibrating other sorts of transmitters, and are not limited to integrated circuit transmitters or wireless communications.

Although in the described embodiments, the elements of test controller 202 are presented in one arrangement, other embodiments may feature other arrangements, as will be apparent to one skilled in the relevant arts based on the disclosure and teachings provided herein. For example, the elements of test controller 202 can be implemented in hardware, software, or combinations thereof.

Referring to FIG. 2, DUT 204 includes a chip controller 206 to control DUT 204, an electrically-erasable programmable read-only memory (EEPROM) 208 to store calibration values, for example as a look-up table, a power amplifier (PA) 210 to amplify a signal according to the calibration values stored in EEPROM 208, and an RF section 212 to generate an RF signal 214 based on the amplified signal. Test controller 202 includes a power meter 216 to measure power levels of RF signal 214, and a calibration circuit 218 to modify the calibration values stored in EEPROM 208 of DUT 204.

Calibration circuit 218 includes an adjustment circuit 220, a memory 222, and an offset circuit 224. Adjustment circuit 220 adjusts a calibration value stored in EEPROM 208 of DUT 204 based on power level measurements of RF signal 214. Memory 222 stores calibration value offsets for a characteristic curve for a group of devices including DUT 204, for example such as the offsets of Table 1. Offset circuit 224 calculates calibration values based on the calibration value determined by adjustment circuit 220 and the offsets stored in memory 222.

Test controller 202 can also include a power point selector 226 and a channel selector 228. Power point selector 226 selects the power points for calibration of DUT 204. Channel selector 228 selects frequency channels for calibration when DUT 204 can transmit in multiple frequency channels.

Figure 3:
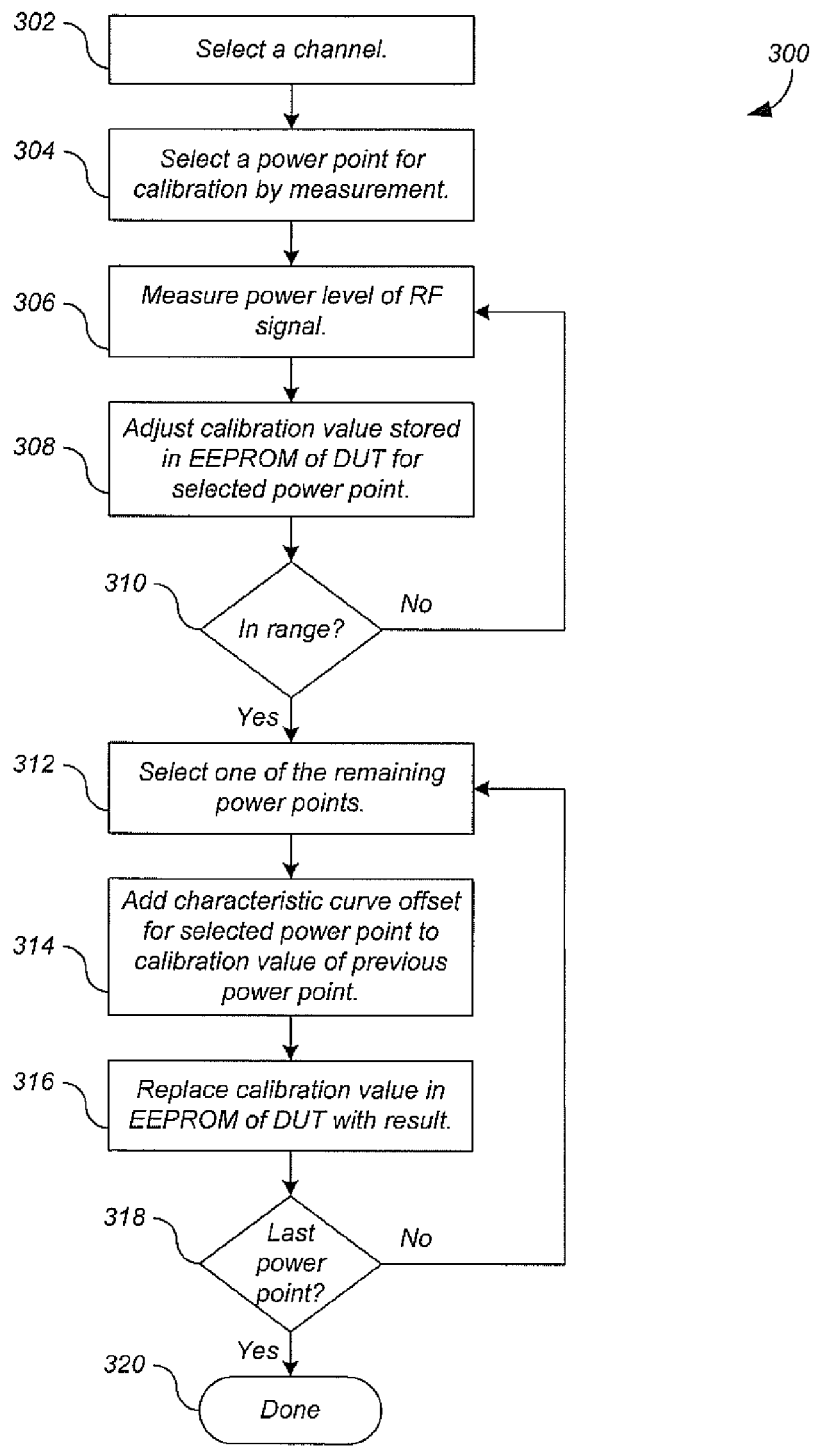
FIG. 3 shows a process for the WLAN chip calibration system of FIG. 2 according to some embodiments of the present invention.

FIG. 3 shows a process 300 for WLAN chip calibration system 200 of FIG. 2 according to some embodiments of the present invention. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

In calibration process 300, test controller 202 first calibrates a power point by measurement of RF signal 214, and then calibrates the remaining power points, without measurement of RF signal 214, by calculations using the calibrated power point and data describing a characteristic curve for DUT 204. Referring to FIG. 3, in embodiments wherein DUT 204 can transmit on multiple frequency channels, channel selector 228 selects one of the channels for calibration (step 302). Power point selector 226 of test controller 202 selects a power point for calibration by measurement (step 304). In response, chip controller 206 of DUT 204 causes DUT 204 to transmit RF signal 214 at the selected power point and channel. In the described embodiments, the power point selected for calibration by measurement is 0 dBm, but of course, another power point can be selected instead. In addition, while only one power point is calibrated by measurement in the described embodiments, multiple power points can be calibrated in this way.

Power meter 216 of test controller 202 measures the power level of RF signal 214 (step 306). Adjustment circuit 220 calibrates the selected power point of DUT 204 by adjusting the calibration value stored in EEPROM 208 of DUT 204 for the power point (step 308). Steps 306 and 308 are repeated until the received power level of RF signal 214 transmitted by DUT 204 falls within the predetermined calibration range for the power point (step 310).

Calibration circuit 218 then calibrates the remaining power points of DUT 204 by calculation, without measurement of RF signal 214. In particular, offset circuit 224 selects one of the remaining power points (step 312), adds the characteristic curve offset for that power point (stored in memory 222) to the calibration value of the previous power point (step 314), and replaces the calibration value in EEPROM 208 of DUT 204 with the result (step 316). For example, offset circuit 224 generates the calibration values shown in Table 2 above.

Process 300 then calculates the calibration value for the next power point in the channel in a similar manner (returning to step 312). When no power points remain in the selected channel (step 318), calibration process 300 is done (step 320).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A calibration system comprising:
   a power selector configured to select a first power level at which a device is to transmit a radio frequency signal to the calibration system, wherein the first power level is among a plurality of power levels at which the device is operable to transmit a radio frequency signal, and wherein the device stores a predetermined calibration value for each of the plurality of power levels;
   a power meter configured to
      receive a radio frequency signal transmitted from the device, the radio frequency signal having been transmitted from the device based on the predetermined calibration value associated with the first power level, and
      measure a power level of the radio frequency signal transmitted from the device;
   an adjustment circuit configured to, based on the measured power level of the radio frequency signal, adjust the predetermined calibration value associated with the first power level so that (i) a measured power level associated with a radio frequency signal transmitted from the device based on the adjusted predetermined calibration value falls within a predetermined range of the first power level; and
   an offset circuit configured to, based on the adjusted predetermined calibration value, calibrate each other predetermined calibration value stored for the plurality of power levels other than the first power level without having (i) the device transmit a radio frequency signal based on each other predetermined calibration value stored for the plurality of power levels.

2. The calibration system of claim 1, wherein:
   the offset circuit is configured to calibrate each other predetermined calibration value stored for the plurality of power levels other than the first power level by replacing each other predetermined calibration value stored for the plurality of power levels other than the first power level with a newly generated calibration value.

3. The calibration system of claim 2, wherein each newly generated calibration value is offset from the adjusted predetermined calibration value by a predetermined offset value associated with the power level corresponding to the newly generated value.

4. The calibration system of claim 3, further comprising a memory, wherein the memory is configured to store each predetermined offset value.

5. The calibration system of claim 4, wherein the memory comprises an electrically-erasable programmable read-only memory (EEPROM).

6. The calibration system of claim 1, wherein:
   the device is operable to transmit a radio frequency signal in one of a plurality of multiple frequency channels; and
   the calibration system further comprises
      a channel selector configured to select a first channel of the plurality of multiple frequency channels in which the device is to transmit the radio frequency signal for calibration.

7. The calibration system of claim 1, wherein the device is compliant with all or part of IEEE standard 802.11, including draft and approved amendments.

8. The calibration system of claim 7, wherein the IEEE standard 802.11 comprises one or more of: 802.11a, 802.11b, 802.11e, 802.11g, 802.11i, 802.11k, 802.11n, 802.11v, and 802.11w.

9. The calibration system of claim 7, wherein the device comprises a wireless local-area network (WLAN) chip.

10. A method comprising:
    selecting a first power level at which a device is to transmit a radio frequency signal, wherein the first power level is among a plurality of power levels at which the device is operable to transmit a radio frequency signal, and wherein the device stores a predetermined calibration value for each of the plurality of power levels;
    receiving a radio frequency signal transmitted from the device, the radio frequency signal having been transmitted from the device based on the predetermined calibration value associated with the first power level;
    measuring a power level of the radio frequency signal transmitted from the device;
    based on the measured power level of the radio frequency signal, adjusting the predetermined calibration value associated with the first power level so that (i) a measured power level associated with a radio frequency signal transmitted from the device based on the adjusted predetermined calibration value falls within a predetermined range of the first power level; and
    based on the adjusted predetermined calibration value, calibrating each other predetermined calibration value stored for the plurality of power levels other than the first power level without having (i) the device transmit a radio frequency signal based on each other predetermined calibration value stored for the plurality of power levels.

11. The method of claim 10, wherein calibrating each other predetermined calibration value stored for the plurality of power levels other than the first power level includes:
    replacing each other predetermined calibration value stored for the plurality of power levels other than the first power level with a newly generated calibration value.

12. The method of claim 11, wherein each newly generated calibration value is offset from the adjusted predetermined calibration value by a predetermined offset value associated with the power level corresponding to the newly generated value.

13. The method of claim 12, wherein:
    the device is operable to transmit a radio frequency signal in one of a plurality of multiple frequency channels; and
    the method further comprises selecting a first channel of the plurality of multiple frequency channels in which the device is to transmit the radio frequency signal for calibration.

14. The method of claim 10, wherein the device is compliant with all or part of IEEE standard 802.11, including draft and approved amendments.

15. The method of claim 14, wherein the IEEE standard 802.11 comprises one or more of 802.11a, 802.11b, 802.11e, 802.11g, 802.11i, 802.11k, 802.11n, 802.11v, and 802.11w.

16. The method of claim 14, wherein the device comprises a wireless local-area network (WLAN) chip.

* * * * *